US 6,694,675 B1

(12) United States Patent
Craft et al.

(10) Patent No.: US 6,694,675 B1
(45) Date of Patent: Feb. 24, 2004

(54) HOLDING ASSEMBLY FOR MOVABLE CLOSURE ELEMENT WITH RELEASABLY CONNECTED FIRST AND SECOND LINKED ELEMENTS

(75) Inventors: David A. Craft, Hucknall (GB); Julie M. Houdek, New Hampton, IA (US); Eric S. Svenby, Sigourney, IA (US); Craig Joseph Helton, Charles City, IA (US); Daniel Alan Bennett, Holland, MI (US)

(73) Assignee: Tri/Mark Corporation, New Hampton, IA (US)

( * ) Notice: Subject to any disclaimer, the term of this patent is extended or adjusted under 35 U.S.C. 154(b) by 0 days.

(21) Appl. No.: 09/689,396

(22) Filed: Oct. 12, 2000

(51) Int. Cl.⁷ .................................................. E05F 11/28
(52) U.S. Cl. ............................ 49/339; 49/345; 292/263
(58) Field of Search ......................... 49/324, 339, 345; 292/262, 263, DIG. 6

(56) References Cited

U.S. PATENT DOCUMENTS

| | | | | |
|---|---|---|---|---|
| 906,305 A | * | 12/1908 | Schacht | 292/340 |
| 956,766 A | * | 5/1910 | Humphrey et al. | 292/263 |
| 1,317,242 A | * | 9/1919 | Thomas | 292/263 |
| 1,701,658 A | * | 2/1929 | Asper | 292/263 |
| 2,093,036 A | * | 9/1937 | Dickason | 454/149 |
| 2,348,654 A | * | 5/1944 | Schmitt | 292/263 |
| 2,811,349 A | * | 10/1957 | Bondurant et al. | 49/324 |
| 4,249,771 A | * | 2/1981 | Gergoe et al. | 296/146.16 |
| 5,203,113 A | * | 4/1993 | Yagi | 49/324 |
| 5,385,061 A | * | 1/1995 | Moy et al. | 74/42 |
| 5,438,801 A | * | 8/1995 | Ishihara et al. | 49/357 |
| 5,680,728 A | * | 10/1997 | Moy | 49/324 |
| 5,901,500 A | * | 5/1999 | Tsuda et al. | 49/324 |
| 5,966,871 A | * | 10/1999 | Tsuda et al. | 49/324 |
| 6,044,587 A | * | 4/2000 | Vetter et al. | 49/324 |
| 6,056,348 A | * | 5/2000 | Tsuda et al. | 296/146.16 |
| 6,073,995 A | * | 6/2000 | Klein | 296/216.02 |
| 6,195,940 B1 | * | 3/2001 | Moy | 49/324 |

FOREIGN PATENT DOCUMENTS

| | | |
|---|---|---|
| DE | 8318318 U1 | 12/1983 |
| DE | 29508296 U1 | 1/1996 |

* cited by examiner

Primary Examiner—Gregory J. Strimbu
(74) Attorney, Agent, or Firm—Wood, Phillips. Katz, Clark & Mortimer

(57) ABSTRACT

The combination of a frame, a closure element, and a closure element holding assembly. The closure element is mounted to the frame for movement between first and second positions. The closure element holding assembly has a linkage with first and second connecting ends and at least first and second link elements. The first connecting end is connected to the closure element. The second connecting end is connected to the frame. The first and second link elements are joined to each other for pivoting movement about a first axis and in such a manner that the first and second link elements can be connected to and disconnected from each other by relatively repositioning at least a part of the first link element and second link element through relative movement of the at least part of the first link element and second link element in a direction generally parallel to the first axis. In one form, one of the link elements has a post and the other link element has a socket to receive the post. The post has a projection and the socket has an extension for receiving the projection. The projection and extension are selectively aligned to facilitate joining and separation of the first and second link elements and misaligned to prevent separation of the joined first and second link elements.

23 Claims, 2 Drawing Sheets

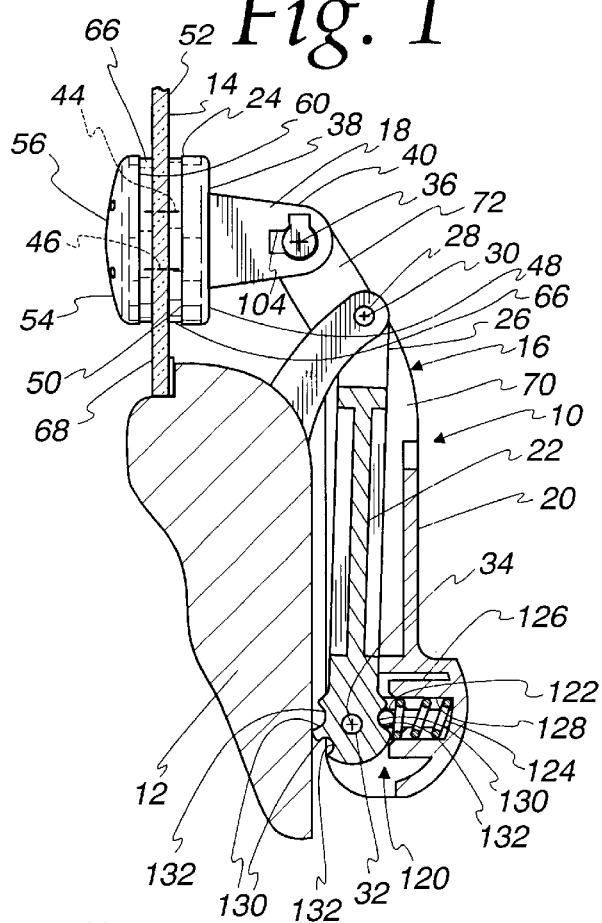
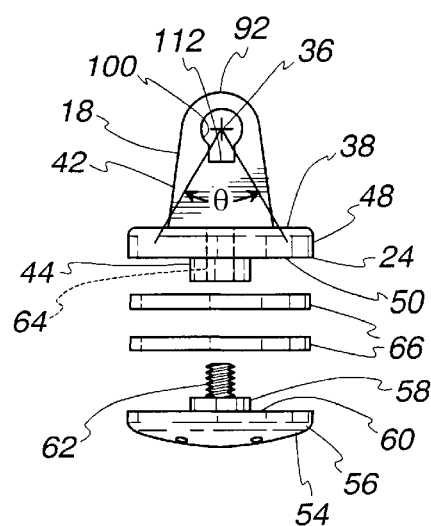
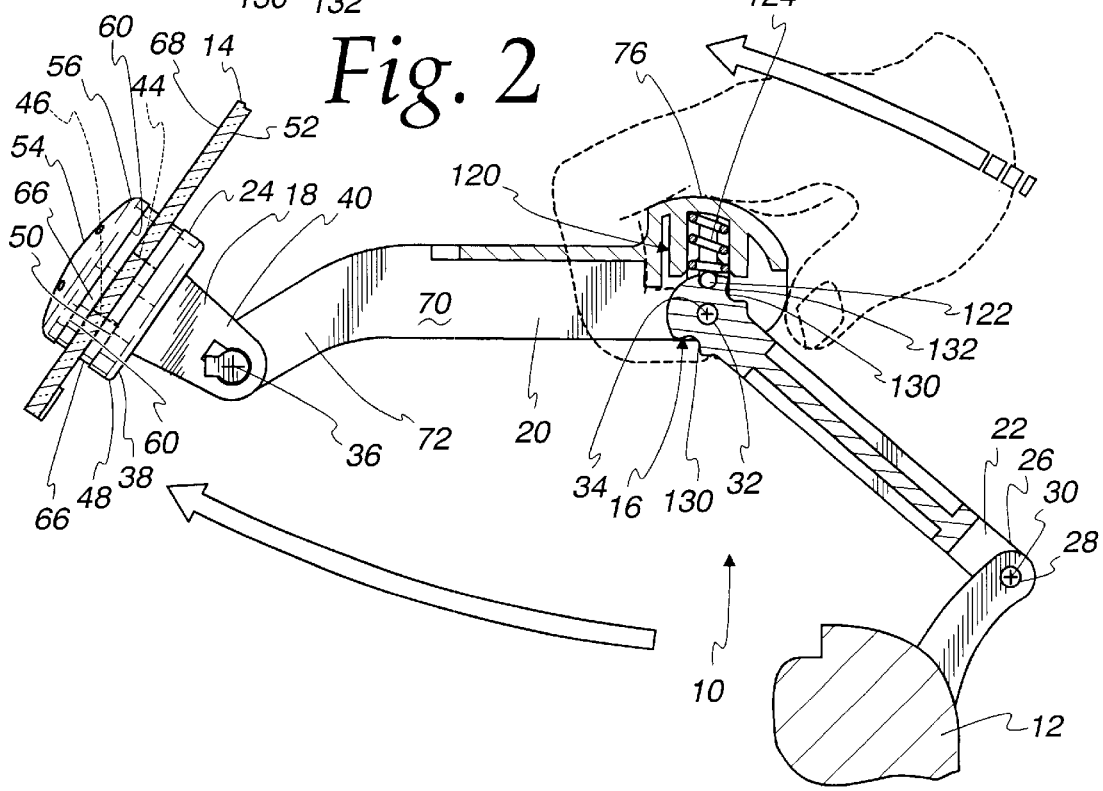

HOLDING ASSEMBLY FOR MOVABLE CLOSURE ELEMENT WITH RELEASABLY CONNECTED FIRST AND SECOND LINKED ELEMENTS

BACKGROUND OF THE INVENTION

1. Field of the Invention

This invention relates to closure elements and, more particularly, to an assembly which allows a closure element to be selectively maintained in a predetermined, open position.

2. Background Art

Closure elements are used in a wide variety of environments. One exemplary closure element is in the form of a vent window, as on farm implements, and the like. Typically, a hold open assembly has a linkage with one link element attached to a frame, upon which the closure element is movably mounted, and another link element having an end which is directly attached to the window. The linkage end attached to the frame is typically held in place by a pin or other fastener that allows pivoting relative to the frame. The window end of the linkage commonly has a fixed disk which facially abuts to the inside of the window and a second disk which is facially abutted to the outside of the window. The disk on the outside is connectable to the fixed disk from the outside and is repositionable relative thereto, as through a threaded connection, to allow adjustable, captive connection of the window between the disks.

It is common to sell the window hold open assembly in a state so that the only readily separable element is the external disk. With this arrangement, the installer pivotably connects the one linkage end to the frame and thereafter relatively repositions the other assembly end and window to allow direction of a part of the window hold open assembly, remote from the frame, through a preformed opening in the window to allow assembly of the external disk element thereto. Alternatively, the window end of the hold open assembly can be attached to the window, whereafter the opposite end is maneuvered to align with an appropriate receptacle on the frame to make a pivot connection thereat.

In either of the above assembly procedures, there is a certain inconvenience involved in having to install the hold open assembly substantially as a unit. The installer may have to work to properly align elements, i.e., the frame, window, and hold open assembly, to permit the connections to be established.

At times, it is also desirable to release the window to an open position beyond that which is permitted by the hold open assembly. To accomplish this, the hold open assembly may have to be released from its connections at the window or on the frame. This may require the removal of the external disk and/or the separation of the pivot element at the frame connection.

SUMMARY OF THE INVENTION

In one form, the invention is directed to the combination of a frame, a closure element, and a closure element holding assembly. The closure element is mounted to the frame for movement between first and second positions. The closure element holding assembly has a linkage with first and second connecting ends and at least first and second link elements. The first connecting end is connected to the closure element. The second connecting end is connected to the frame. The first and second link elements are joined to each other for pivoting movement about a first axis and in such a manner that the first and second link elements can be connected to and disconnected from each other by relatively repositioning at least a part of the first link element generally parallel to the first axis relative to the second link element.

In one form, there is a first post on one of the first and second link elements and a first socket on the other of the first and second link elements for receiving and guiding movement of the first post around the first axis. The first post has a first radial projection and the first socket has a first radial extension which allows the first radial projection on the first post to be passed through the first radial extension as the first post is directed in a first axial direction, with the one link element in a pre-assembly position relative to the other link element and the first and second link elements in a first relative rotational position, to a position wherein the first and second link elements are in an operative position. The other link element blocks axial movement of the first radial projection as the first post is directed in the first axial direction with the one link element in the pre-assembly position with the first and second link elements in a second relative rotational position.

In one form, the other link element has a first surface facing in one axial direction and the first radial projection has a second surface facing axially oppositely to the one direction. The first and second surfaces abut to prevent the first post from withdrawing from the first socket with the first and second link elements in the operative position and the first and second link elements in the second relative rotational position.

In one form, the one link element has spaced first and second legs and the other link element has spaced third and fourth legs and one of a) the first and second legs and b) the third and fourth legs reside between the other of a) the first and second legs and b) the third and fourth legs with the first and second link elements in the operative position.

In one form, the first post is on one of the first and third legs and the first socket is on the other of the first and third legs.

A second post may be provided on one of the second and fourth legs and has a construction the same as the first claimed post, with there being a second socket on the other of the second and fourth legs having a construction the same as the first socket. The second post and second socket cooperate with each other in the same manner that the first post and first socket cooperate with each other.

In one form, the second post has a second radial projection and the second socket has a second radial extension, with the second radial projection cooperating with the second radial extension in the same manner as the first radial projection cooperates with the first radial extension.

In one form, the first and second posts define a common pivot axis and the first and second posts project axially oppositely from their respective leg relative to the common pivot axis.

In one form, the first and second posts are on the first and second legs, the first and second sockets are on the third and fourth legs, and the first and second legs reside between the third and fourth legs. At least one of a) the first and second legs and b) the third and fourth legs are deflectable axially relative to the common pivot axis to allow placement of the one link element in the pre-assembly position and return of the one link element towards an undeflected state with the first and second link elements in the operative position.

In one form, the first and second legs have third and fourth surfaces that face axially oppositely relative to the common pivot axis and the third and fourth legs have fifth and sixth surfaces that face each other and are abuttable, one each to the third and fourth surfaces.

In one form, the first, second, third, and fourth legs are substantially flat, each having substantially flat oppositely facing surfaces that are substantially parallel to each other and the flat oppositely facing surfaces on the other legs.

In one form, one of the first and second link elements is connected to the closure element and there is a third link element connecting between the frame and the other of the first and second link elements through a pivot connection. There is further a cooperating detent mechanism for releasably maintaining the third link element and the other of the first and second link elements in a plurality of different relative positions.

The third and the other of the first and second link elements may be placeable selectively in an over-center position.

The invention is also directed to a holding assembly having the construction as described above.

BRIEF DESCRIPTION OF THE DRAWINGS

FIG. 1 is a fragmentary, partial cross-sectional, side elevation view of a frame with a movable closure element thereon, and with a holding assembly, according to the invention, connecting between the frame and closure element and with the closure element in a closed position;

FIG. 2 is a view as in FIG. 1 with the closure element holding assembly repositioned to place the closure element in a partially open position;

FIG. 6 is an exploded, side elevation view of one of the link elements on the closure element holding assembly which attaches to the closure element.

DETAILED DESCRIPTION OF THE DRAWINGS

Figure 3:
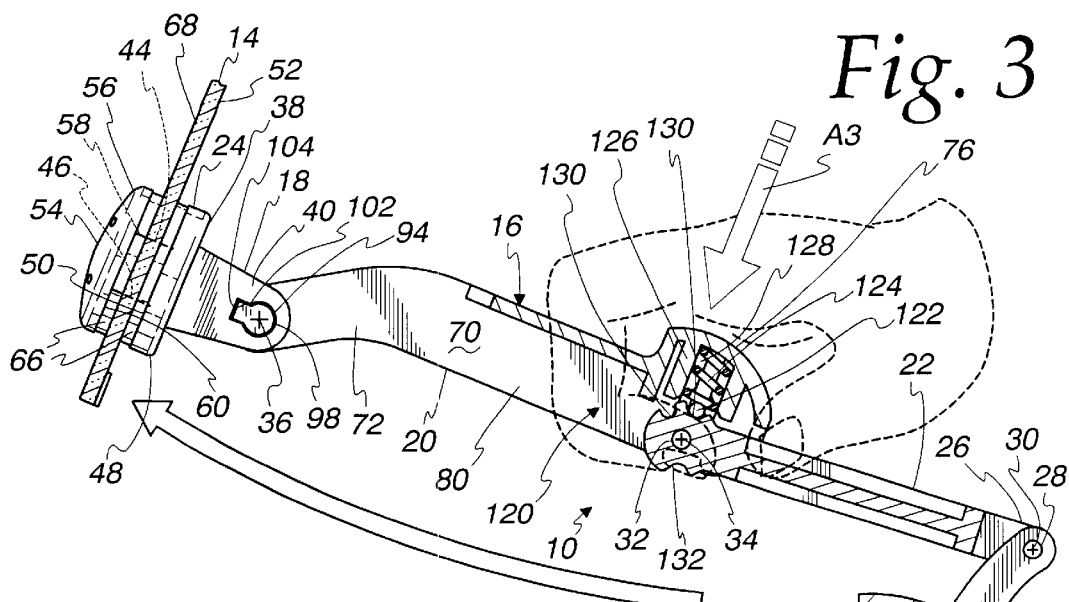
FIG. 3 is a view as in FIG. 2 with the closure element holding assembly repositioned to place the closure element in a full open position.
Figure 4:
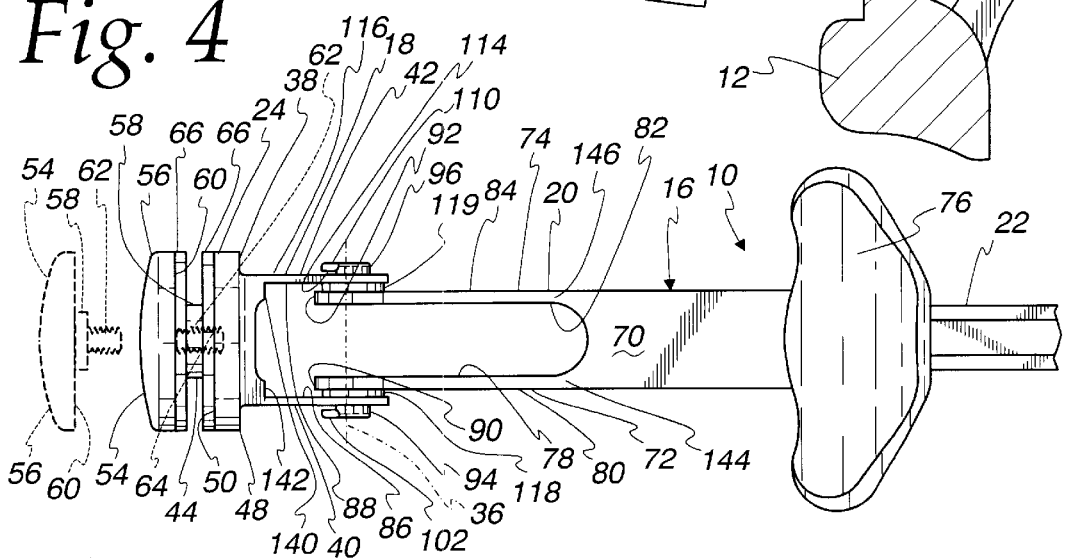
FIG. 4 is a fragmentary, plan view of first and second link elements on the closure element holding assembly in an operative position relative to each other.

In FIGS. 1–6, a preferred form of holding assembly, according to the present invention, is shown at 10, operatively connecting between a frame 12 and a closure element 14. The closure element 14 may be any type of movable closure element, as used in a multitude of different environments. As examples, the closure element 14 may be a side vent window on a piece of agricultural equipment or a roof-mounted window, as on an automobile. In this case, the closure element 14 is movable between a fully open position, shown in FIG. 3, and a fully closed position, shown in FIG. 1.

The holding assembly 10 includes a linkage 16, in this case having a first link element 18, a second link element 20, and a third link element 22. The linkage 16 has a first connecting end 24 connected to the closure element 14 and a second connecting end 26 connected to the frame 12 by a pin 28 for pivoting movement around an axis 30 relative to the frame 12. Through a pin 32, the second link element 20 is connected to the third link element 22 for relative pivoting movement about an axis 34, which is parallel to the axis 30. The first link element 18 is connected to the second link element 20 for pivoting movement relative thereto around an axis 36, that is substantially parallel to the axes 30, 34.

The first link element 18 has a disk-shaped body 38 with first and second spaced legs 40, 42 projecting in one direction away therefrom. The body 38 has a stepped, cylindrical shape with a smaller diameter portion 44 projecting through an opening 46 through the closure element 14 and a larger diameter portion 48 having a flat surface 50 for bearing against an inside surface 52 of the closure element 14.

A cap element 54 is provided to secure the first link element 18 to the closure element 14. The cap element 54 has a stepped, cylindrical body 56 with a smaller diameter portion 58 having a diameter substantially equal to that of the smaller diameter portion 44 of the body 38, to allow passage into the closure element opening 46. The cap element 54 has a flat surface 60 which faces the surface 50 of the body 38 with the cap element 54 operatively connected to the first link element 18.

The cap element 54 has a threaded post 62 which can be passed through the closure element 14 and into a blind, threaded bore 64 in the first link element 18. By rotating the cap element 54 to effect tightening thereof, the surfaces 50, 60 are drawn closer together to captively engage the closure element 14. Preferably rubber gaskets 66 are interposed, one each, between the surface 50 and the inside surface 52 of the closure element 14, and the surface 60 and the outside surface 68 of the closure element 14. The gaskets 66 are deformable to facilitate the formation of a leakproof connection between the first link element 18 and the closure element 14, and to produce a positive gripping action between the body 38, the cap element 54, and the closure element 14 without a concentrated stress that might precipitate failure of the closure element 14.

The second link element 20 has a body 70 with a pair of spaced, elongate legs 72, 74 which project from a graspable handle 76. The handles 76 and legs 72, 74 together make an overall "T" shape. The legs 72, 74 each have a flat shape with the leg 72 having oppositely facing, substantially parallel, flat surfaces 78, 80 and the leg 74 having corresponding surfaces 82, 84, parallel to each other and the flat surfaces 78, 80.

Figure 5:
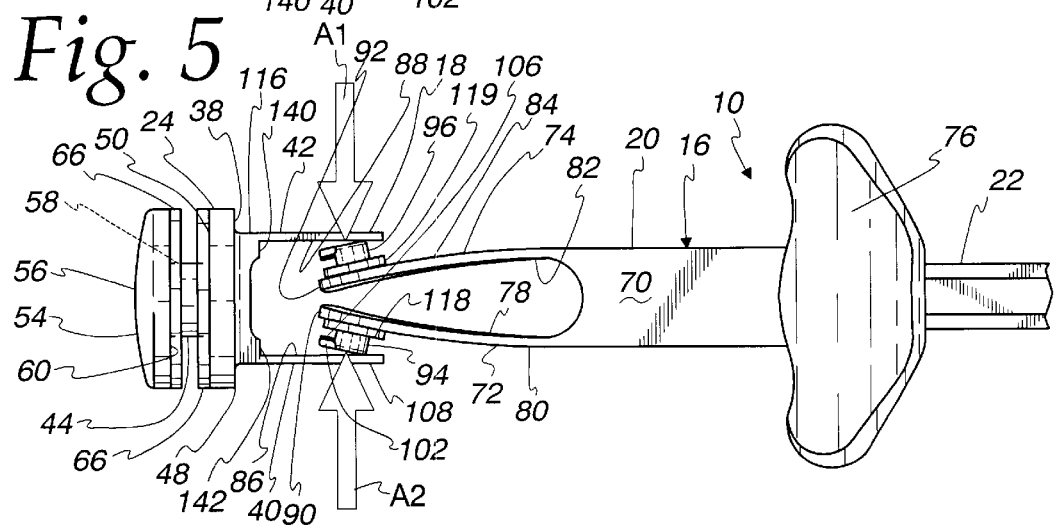
FIG. 5 is a view as in FIG. 4 with one of the link elements deformed to a pre-assembly position to facilitate assembly of the link elements into the operative position.

The legs 72, 74 are dimensioned to reside between facing, flat surfaces 86, 88 on the legs 40, 42 on the first link element 18 with the first and second link elements in an operative position, as seen in FIGS. 1–4. The spacing between the ends 90, 92 of the legs 72, 74, with the legs 72, 74 relaxed, may be slightly greater than the spacing between the surfaces 86, 88 of the legs 40, 42. By reason of their shape, the legs 72, 74 can be deflected towards each other to a pre-assembly position, as seen in FIG. 5 to allow posts 94, 96 on the legs 72, 74 to be projected into sockets 98, 100 on the legs 40, 42 on the first link element 18.

The sockets 98, 100 guide the posts 94, 96 in movement around the common pivot axis 36. The posts 94, 96 project axially oppositely from their respective legs 72, 74. Each post 94, 96 has the same construction, as do the cooperating sockets 98, 100. Accordingly, the description of the relationship between only one of the posts 94, 96 and sockets 98, 100 will be described.

The post 94 has a radial projection 102 which gives the post 94 and projection 102 a keyhole profile from an axial perspective. To accommodate the projection 102, the socket 98 has a correspondingly-shaped radial extension 104. With the central axis of the post 94 coaxial with central axis of the socket 98, and the leg 72 deflected to the pre-assembly position of FIG. 5 in which the post 94 is repositioned generally parallel to the axes 30, 36 from a position it occupies with the leg 72 relaxed, the leg 72 can be released towards an undeflected state so that the post 94 and projection 102 pass through the socket 98 and extension 104 to place the first and second link elements 18, 20 in the operative position. Accordingly, to effect the assembly, the leg 72 is bent to the pre-assembly position of FIG. 5, and the first link element 18 and second link element 20 relatively rotationally positioned to align the projection 102 with the extension 104. By then releasing the deflected leg 72, the post 94 can be advanced through the socket 98 while the projection 102 passes through the extension 104 to a point that an axially facing surface 106 on the post 94 moves beyond a flat surface 108 that is parallel to the flat surface 86 on the leg 40 of the first link element 18. Relative rotation between the first link element 18 and second link element 20 away from the position wherein the projection 102 and extension 104 are aligned, results in the presentation of the extension surface 106 to the surface 108 on the first link element 18, which thereby prevents withdrawal of the post 94 from the socket 98.

The leg 74 on the second link element 20 is similarly connected to the leg 42 on the first link element 18. Simultaneous connection between the leg elements 72, 74 and 40,42 can be effected by squeezing the leg ends 90, 92 on the legs 72, 74 towards each other and generally in a direction parallel to the axes 30, 36 as indicated by the arrows A1, A2, and aligning the posts 94, 96 with the respective sockets 98, 100 by relative rotation to a position wherein the projection 102 can be advanced through the extension 104 and a projection 110 on the post 96 advanced through a complementary socket extension 112 on the leg 42. By then releasing the legs 72, 74, the posts 94, 96 fully seat. The post 96 has an axially facing surface 114 which is abuttable to a surface 116 on the leg 42 that is spaced and substantially parallel to the surface 88 on the leg 42.

With this arrangement, the surfaces 86, 88 are abuttable to annular projections 118, 119, which define a part of the surfaces 78, 84, to confine spreading of the legs 72, 74. The legs 72, 74 can be spaced so that there is a residual bias force urging the posts 94, 96 into the sockets 98, 100, which reduces the likelihood of escape of the posts 94, 96 from the sockets 98, 100.

Preferably, the first and second link elements 18, 20 are made from a plastic material with substantial strength, yet which has the necessary flexibility and memory to allow assembly and disassembly of the first and second link elements 18, 20. With this arrangement, the first and second link elements 18, 20 can be operatively connected, each to the other, and disassembled, without the need for separate fasteners. The first link element 18 can be pre-assembled to the closure element 14 and the third link element 22 pre-assembled to the frame 12, whereafter the aforementioned assembly process can be carried out between the first link element 18 and second link element 20.

A detent mechanism 120 is provided for connection between the second link element 20 and third link element 22 to allow the second and third link elements 20, 22 to be placed in a plurality of different positions and the closure element 14 to thereby be maintained releasably in at least one position between the open and closed positions.

The detent mechanism 12- consists of a pin 122 having a length extending generally parallel to the axis 34 and biased by a coil spring 124 towards the axis 34. An annular boss 126 is formed in the vicinity of the handle 76 to define a cylindrical seat 128 for the coil spring 124.

The third link element 22 has a plurality of undercuts 130 which are dimensioned to receive the pin 122. The undercuts 130 each have a curved, concave seat 132 to accept the pin 122. In FIG. 2, the pin 122 is shown nested in one seat 132 with the closure element 14 in a partially open state. By exerting a rotative force on the third link element 22 through the application of a force on the handle 76 in the direction of the arrow A3 in FIG. 3, the surface 134 of the seat 132 cams the pin 122 downwardly against the force of the spring 124 and the linkage 16 moves towards an over-center state, as shown in FIG. 3, with the closure element 14 in a fully open position. This is a progressive camming action. As the third link element 22 continues to pivot, the pin 122 moves out of the seat 132. Upon further pivoting movement, the next seat 132 aligns with the pin 122, which is biased thereinto. The detent arrangement can be employed to allow the linkage 16 to snap into a position corresponding to the closed position for the closure element 14, as shown in FIG. 1. This permits tactile or audible sensing of the fully closed position by a user. While in this case three different seats 132 are shown, this is a design consideration.

The range of relative pivoting movement between the first link 18 and second link 20 is confined by spaced edges 140, 142, which simultaneously abut edges 144, 146 on the legs 72, 74 at one extreme of pivoting and oppositely facing edges (not shown) on the legs 144, 146 at the other pivoting extreme. This pivoting range is identified with the angle θ in FIG. 6.

The foregoing disclosure of specific embodiments is intended to be illustrative of the broad concepts comprehended by the invention.

We claim:

1. In combination:

a frame;

a closure element mounted to the frame for movement between first and second positions; and a closure element holding assembly, said closure element holding assembly comprising:

a linkage having first and second connecting ends and comprising at least first and second link elements joined to each other for relative pivoting movement around an axis, the first connecting end connected to the closure element, the second connecting end connected to the frame, the first link element comprising spaced first and second legs and the second link element comprising spaced third and fourth legs, the first and second link elements being joined to each other in such a manner that the first and second link elements can be selectively connected to and disconnected from each other by relatively repositioning a) the first and second legs and b) the third and fourth legs generally parallel to the axis, the first leg having a first surface, the third leg having a second surface, the first and second surfaces a) abutting each other to prevent the joined first and second link elements from being disconnected and separated from each other by relative movement of the first leg and third leg generally parallel to the axis with the first link element and the second link element in a first relative rotational position around the axis, b) being movable one past the other by relative movement of the first leg and third leg generally parallel to the axis to permit the joined first and second link elements to be disconnected with the first link element and the second link element in a second relative rotational position around the axis, and c) not being capable of separating from each other by relative movement of the first leg and third leg generally parallel to the axis with the first and second link elements in the first relative rotational position, wherein the second and fourth legs overlap and engage one another with the first and second link elements joined together.

2. The combination according to claim 1 wherein one of the first and second link elements includes the first connecting end, there is a third link element connecting between the frame and the other of the first and second link elements through a pivot connection, and there is a cooperating detent mechanism for releasably maintaining the third link element and the other of the first and second link elements in a plurality of different relative positions.

3. The combination according to claim 1 wherein one of the first and second link elements includes the first connecting end, there is a third link element connecting between the frame and the other of the first and second link elements through a pivot connection, and there is a cooperating detent mechanism for releasably maintaining the third link element and the other of the first and second link elements in a plurality of different relative positions, the third and the other of the first and second link elements placeable selectively in an over-center position.

4. In combination:
   a frame;
   a closure element mounted to the frame for movement between first and second positions; and
   a closure element holding assembly, said closure element holding assembly comprising:
      a linkage having first and second connecting ends and comprising at least first and second link elements joined to each other in an operative position for relative pivoting movement around an axis,
      the first connecting end connected to the closure element,
      the second connecting end connected to the frame,
      the first link element comprising spaced first and second legs and the second link element comprising spaced third and fourth legs,
      the first and second link elements being joined to each other in such a manner that the first and second link elements can be selectively connected to and disconnected from each other by relatively repositioning a) the first and second legs and b) the third and fourth legs in a direction generally parallel to the axis,
      wherein the first leg includes one of a first Post and a first socket and the third leg includes the other of the first post and the first socket, and the second leg includes one of a second post and a second socket and the fourth leg includes the other of the second post and the second socket, the first post cooperating with the first socket and the second post cooperating with the second socket to operatively guide relative movement of the first and second link elements about the axis, the first post has a first radial projection and the first socket has a first radial extension which allows the first radial projection on the first post to be passed through the first radial extension as the first post is directed in the direction generally parallel to the axis with the first leg in a pre-assembly position relative to the third leg and the first and second link elements in a first relative rotational position around the axis, to thereby place the first and second link elements in the operative position, the one of the first and third legs including the first socket blocking axial movement of the first radial projection as the first post is directed in the direction generally parallel to the axis with the first and third legs in the pre-assembly position and with the first and second link elements in a second relative rotational position around the axis.

5. The combination according to claim 4 wherein the one of the first and third legs including the first socket has a first surface facing in one axial direction and the first radial projection has a second surface facing axially oppositely to the one direction and the first and second surfaces abut to prevent the first post from withdrawing from the first socket with the first and second link elements in the operative position and the first and second link elements in the second relative rotational position.

6. The combination according to claim 5 wherein one of a) the first and second legs and b) the third and fourth legs reside between the other of a) the first and second legs and b) the third and fourth legs with the first and second link elements in the operative position.

7. The combination according to claim 6 wherein the first post is on the first leg and the first socket is on the third leg.

8. The combination according to claim 7 wherein the second post has a second radial projection and the second socket has a second radial extension which allows the second radial projection on the second post to be passed through the second radial extension as the second post is directed in the direction generally parallel to the axis with the second leg in a pre-assembly position relative to the fourth leg and the first and second link elements in a first relative rotational position around the axis.

9. The combination according to claim 8 wherein the first and second posts define a common pivot axis and the first and second posts project axially oppositely from their respective leg relative to the common pivot axis.

10. The combination according to claim 9 wherein the first and second posts are on the first and second legs, respectively, the first and second sockets are on the third and fourth legs, respectively, the first and second legs reside between the third and fourth legs, and at least one of a) the first and second legs and b) the third and fourth legs are deflectable axially relative to the other of a) the first and second legs and b) the third and fourth legs to allow movement of the first and third legs into and out of the pre-assembly position with the first and second link elements in the first relative rotational position.

11. The combination according to claim 10 wherein the first, second, third, and fourth legs are substantially flat and are substantially parallel to each other.

12. The combination according to claim 10 wherein the first and second legs have third and fourth surfaces that face axially oppositely relative to the common pivot axis and the third and fourth legs have fifth and sixth surfaces.

13. A holding assembly for connecting between a frame and a movable closure element mounted to the frame to selectively releasably maintain the closure element in a plurality of different positions relative to the frame, the holding assembly comprising:
   a linkage having first and second connecting ends and comprising at least first and second link elements,
   the first connecting end connectable to the closure element,
   the second connecting end connectable to the frame,
   the first link element comprising spaced first and second legs and the second link element comprising spaced third and fourth legs,
   the first and second link elements being releasably joined to each other for pivoting movement about an axis and in such a manner that the first and second link elements can be selectively connected to and disconnected from each other by relatively repositioning a) the first and second legs and b) the third and fourth legs generally parallel to the axis,
   the first leg having a first surface,
   the third leg having a second surface,
   the first and second surfaces a) abutting each other to prevent the joined first and second link elements from being disconnected and separated from each other by relative movement of the first leg and third leg generally parallel to the axis with the first link element and the second link element in a first relative rotational position around the axis, b) being movable one past the other by relative movement of the first leg and third leg generally parallel to the axis to permit the joined first and second link elements to be disconnected with the first link element and the second link element in a second relative rotational position around the axis, and
c) not being capable of separating from each other by relative movement of the first leg and third leg generally parallel to the axis with the first and second link elements in the first relative rotational position,
wherein the second and fourth legs overlap and engage one another with the first and second link elements joined together.

14. The holding assembly according to claim 13 wherein one of the first and second link elements includes the first connecting end, there is a third link element connecting between the frame and the other of the first and second link elements through a pivot connection, and there is a cooperating detent mechanism for releasably maintaining the third link element and the other of the first and second link elements in a plurality of different relative positions.

15. The holding assembly according to claim 14 wherein the third and the other of the first and second links are placeable selectively in an over-center position.

16. A holding assembly for connecting between a frame and a movable closure element mounted to the frame to selectively releasably maintain the closure element in a plurality of different positions relative to the frame, the holding assembly comprising:
a linkage having first and second connecting ends and comprising at least first and second link elements,
the first connecting end connectable to the closure element,
the second connecting end connectable to the frame,
the first link element comprising spaced first and second legs and the second link element comprising spaced third and fourth legs,
the first and second link elements being releasably joined to each other in an operative position for pivoting movement about an axis and in such a manner that the first and second link elements can be selectively connected to and disconnected from each other by repositioning a) the first and second legs and b) the third and fourth legs generally parallel to the axis,
wherein there is a first post on one of the first and third legs and a first socket on the other of the first and third legs for receiving and guiding movement of the first post around the axis, the first post has a first radial projection and the first socket has a first radial extension which allows the first radial projection on the first post to be passed through the first radial extension, as the first post is directed in an axial direction with the first leg in a pre-assembly position relative to the third leg and the first and second link elements in a first relative rotational position, to place the first and second link elements in the operative position, the one of the first and third legs including the first socket blocking axial movement of the first post as the first post is directed in the axial direction with the first and third legs in the pre-assembly position and the first and second link elements in a second relative rotational position,
wherein the second and fourth legs overlap and engage one another with the first and second link elements in the operative position.

17. The holding assembly according to claim 16 wherein the one of the first and third legs including the first socket has a first surface facing in one axial direction and the first radial projection has a second surface facing axially oppositely to the one direction and the first and second surfaces abut to prevent the first post from withdrawing from the first socket with the first and second link elements in the operative position and the first and second link elements in the second relative rotational position.

18. The holding assembly according to claim 17 wherein the first post is on the first leg and the first socket is on the third leg.

19. The holding assembly according to claim 18 wherein there is a second post on one of the second and fourth legs and a second socket on the other of the second and fourth legs for receiving and guiding movement of the second post around the axis, the second post has a second radial projection and the second socket has a second radial extension which allows the second radial projection on the second post to be passed through the second radial extension, as the second post is directed in the axial direction with the second leg in a pre-assembly position relative to the fourth leg and the first and second link elements in the first relative rotational position, to place the first and second link elements in the operative position, the one of the second and fourth legs including the second socket blocking axial movement of the second post as the second post is directed in the axial direction with the second and fourth legs in the pre-assembly Position and the first and second link elements in the second relative rotational position.

20. The holding assembly according to claim 19 wherein the first and second posts define a common pivot axis and the first and second posts project axially oppositely from their respective leg relative to the common pivot axis.

21. The holding assembly according to claim 20 wherein the first and second posts are on the first and second legs, respectively, the first and second sockets are on the third and fourth legs, respectively, the first and second legs reside between the third and fourth legs, and at least one of a) the first and second legs and b) the third and fourth legs are deflectable axially relative to the other of a) the first and second legs and b) the third and fourth legs to allow movement of the first and third legs into and out of the pre-assembly position with the first and second link elements in the first relative rotational position position.

22. The holding assembly according to claim 21 wherein the first and second legs have third and fourth surfaces that face axially oppositely relative to the common pivot axis and the third and fourth legs have fifth and sixth surfaces.

23. The holding assembly according to claim 21 wherein the first, second, third, and fourth legs are substantially flat and are substantially parallel to each other.

* * * * *